Sept. 25, 1962 T. R. SMITH 3,055,158
GAS FILTER APPARATUS
Filed July 27, 1959 2 Sheets-Sheet 1

INVENTOR
TOM R. SMITH

BY Ralph B. Brick
ATTORNEY

Sept. 25, 1962     T. R. SMITH     3,055,158
GAS FILTER APPARATUS
Filed July 27, 1959     2 Sheets-Sheet 2

INVENTOR
TOM R. SMITH

BY

Ralph B. Brick
ATTORNEY

United States Patent Office 3,055,158
Patented Sept. 25, 1962

3,055,158
GAS FILTER APPARATUS
Tom R. Smith, Louisville, Ky., assignor to American Air Filter Company, Inc., Louisville, Ky., a corporation of Delaware
Filed July 27, 1959, Ser. No. 829,567
3 Claims. (Cl. 55—118)

This invention relates to gas filters and more particularly to washing apparatus for gas filters of the electrostatic type.

In electrostatic gas filters, the gas stream to be treated passes through a housing having upstream and downstream openings. Disposed within the housing between the openings is a filter assembly comprised of parallel, spaced, charged and grounded electrode plates. The plates are arranged alternately to electrostatically treat the gas stream so that solid particles in the stream are deposited and held thereon, the plates often being coated with a suitable adhesive in order to enhance precipitation. At suitable intervals, precipitating operations are interrupted so that deposits precipitated on the plates can be removed. Once this has been accomplished, precipitating operations can be resumed effectively.

In many electrostatic gas filter installations of the past, it has been the practice to remove deposits from precipitator plates by means of washing apparatus which has sprayed a suitable washing fluid against the plates at selected intervals. These past washing arrangements have not, however, always proven to be as efficient as has been desired. They have required large amounts of washing fluid—much of which has not been dispelled effectively during washing operations. Further, they have used mechanisms to effect spraying of the filter assembly which have been complex and costly and which have had concomitant problems in both construction and maintenance.

In accordance with the present invention, a washing apparatus is provided for a gas filter assembly which avoids the abovementioned disadvantages and problems. More specifically, the present invention provides a washing apparatus for a gas filter assembly which is economical to construct and maintain and which requires a minimum of moving parts to effectively utilize the washing fluid dispelled therefrom.

Various other features of the present invention will become obvious to one skilled in the art upon reading the disclosure set forth hereinafter.

More particularly, the present invention provides, in a gas filter apparatus including a housing having upstream and downstream openings with a filter assembly disposed therebetween for treating a gas stream, a washer for the filter assembly comprising fluid header means mounted adjacent an opening of the housing to rotate in a plane substantially normal to the direction of flow of the gas stream to be treated and nozzle means mounted on the fluid header, the nozzle means being shaped to concentrate fluid from the header in flat sheets and being positioned to direct such flat sheets at preselected angles toward the filter assembly in the housing.

It is to be understood that various changes can be made in the arrangement, form and construction of the apparatus disclosed herein without departing from the scope or spirit of the present invention.

Referring to the drawings.

Figure 1:
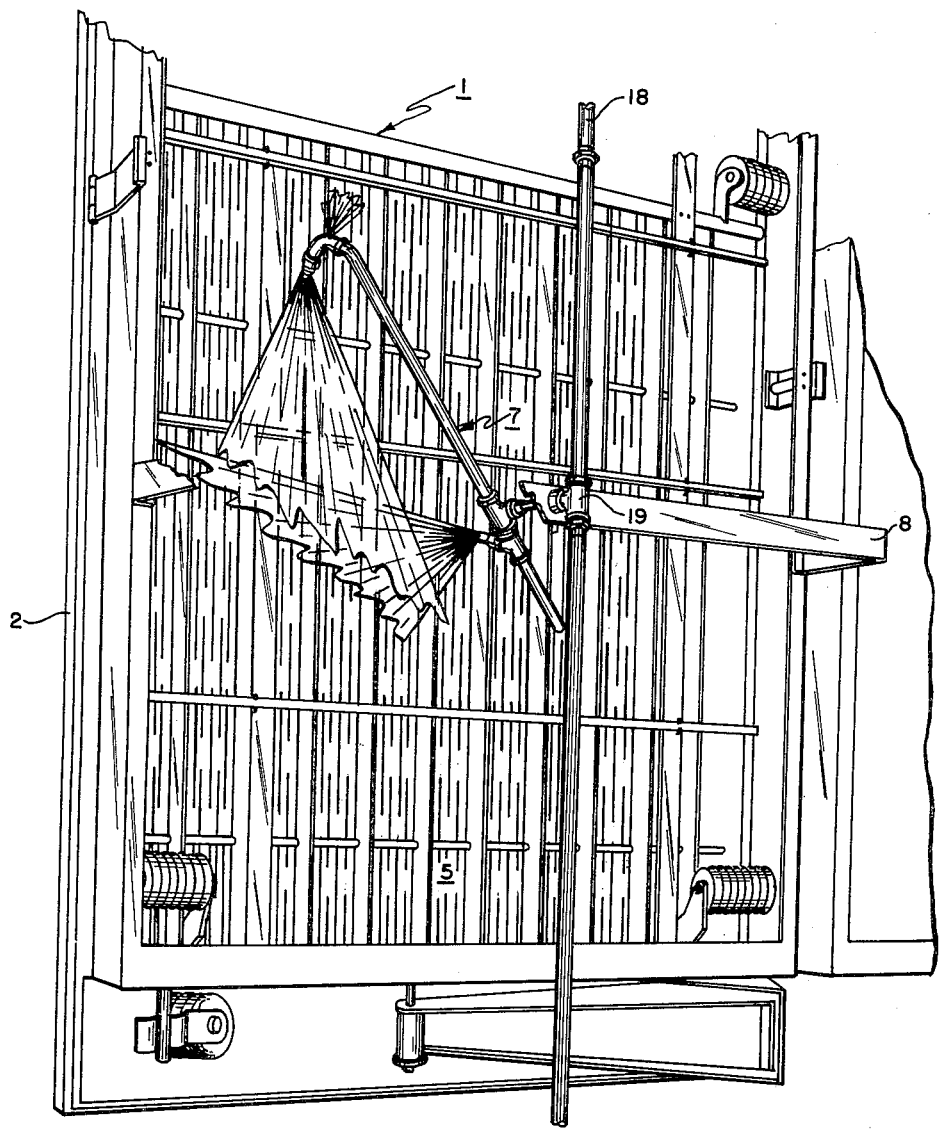
FIGURE 1 is a perspective view of a portion of an electrostatic type gas filter apparatus embodying the features of the present invention, the plates of the filter assembly being disclosed schematically.

Referring to FIGURE 1 of the drawings, an embodiment of the inventive apparatus is disclosed in conjunction with an otherwise conventional electrical dust precipitator 1 similar to that disclosed in assignee's United States Patent No. 2,486,521, issued to Verner Dahlman on November 1, 1949. Since this type of precipitator is now well known in the art and since it does not, in itself, comprise a critical part of the present invention, details of the same are not set forth herein. For purposes of describing the advantageous embodiment of the invention disclosed, it is considered only necessary to explain that precipitator 1 includes filter housing 2 having gas inlet and gas outlet openings with an electrostatic filter assembly 5 disposed therebetween, the filter assembly including parallel, spaced, charged and grounded electrode plates which are broadly designated by the reference numeral 6 in FIGURE 2 of the drawings.

Mounted on housing 2 of the precipitator 1 adjacent the inlet or upstream opening of housing 2 is the inventive washer assembly, broadly designated by reference numeral 7. In order to mount washer assembly 7 to precipitator 1, U-shaped saddle support member 8 is provided, the ends of the short legs of support member 8 being fastened to precipitator housing 2 by some suitable means such as welding or bolting.

Figure 3:
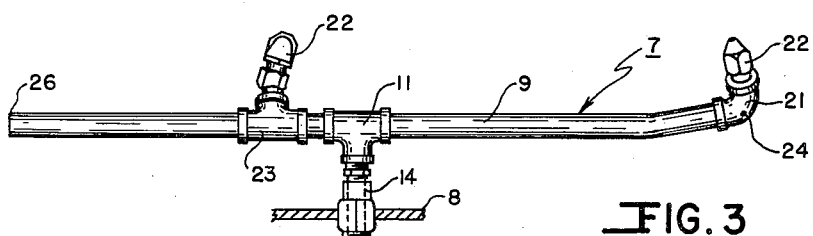
FIGURE 3 is an enlarged plan view of a portion of the washer assembly.
Figure 4:
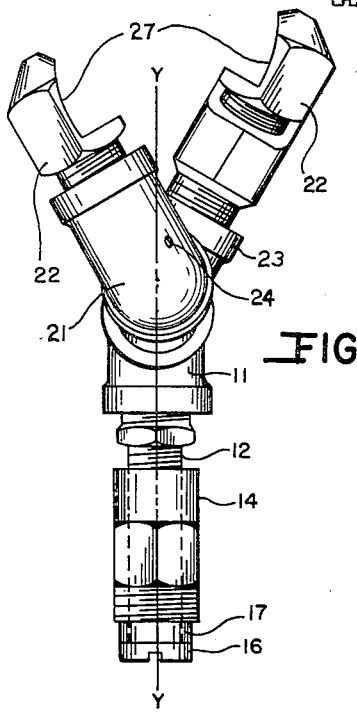
FIGURE 4 is a further enlarged end view of a portion of the apparatus disclosed in FIGURE 3.

Referring to FIGURES 3 and 4 of the drawings, it can be seen that washer assembly 7 includes a fluid header in the form of conduit 9. Conduit 9 is connected to saddle support member 8 through T fitting 11 interposed between the ends of the conduit. Connected to T fitting 11 is nipple 12, this nipple extending in relatively rotatable fashion through bushing 14. Bushing 14, in turn, is mounted to the base of saddle member 8 substantially halfway between the legs thereof which, as abovedescribed, are connected to housing 2. To maintain nipple 12 in proper position within the bushing 14, the nipple is integrally flanged at 16, a thrust washer 17 being provided between flange 16 and the end of bushing 14 to accommodate for wear.

In the arrangement so far described, it is to be noted that conduit 9 can rotate in a plane which is spaced in parallel relation to the face of filter assembly 5 and which is substantially normal to the direction of flow of the gas stream to be treated. This is possible as a result of the nipple-bushing saddle support assembly aforedescribed, it being further noted that the longitudinal center line of the nipple serves as the axis of rotation Y—Y for conduit 9. To deliver washing fluid to conduit 9 from a suitable fluid supply source (not shown), conduit 18 is provided to connect such suitable supply source to nipple 12 by means of T fitting 19 interposed in conduit 18. It is to be understood that the supply source can be city water delivered through conduit 18 at a pressure of 40 p.s.i. and that suitable on-off valve mechanism (not shown) can be associated with conduit 18 to control the flow of fluid therethrough.

Connected at what constitutes one of the distal ends of conduit 9 through elbow fitting 21 is one of a pair of like nozzles 22. The other nozzle 22 of the pair is connected to conduit 9 through T fitting 23 positioned on the other side of the axis of rotation of conduit 9 and proximal to such axis. It is to be noted that elbow fitting 21 is provided with a small jet discharge aperture 24 to enhance rotation of the conduit 9. It further is to be noted that the opposite distal end of conduit 9 is sealed as at 26 by some suitable means.

Referring to FIGURES 3 and 4 of the drawings, it can be seen that each of nozzles 22 is provided with an outlet 27 of spoon-shape contour. With such an arrangement washing fluid can be discharged from each outlet in a concentrated flat sheet so that there is an increased mass of fluid per unit area which is delivered to the spaced plates 6 of the filter assembly to provide more effective washing. Further, since the fluid is concentrated in the manner described, the air resistance thereto is substantially decreased. As a result, fluid impinges against the plate 6 with an increased velocity to further enhance washing efficiency. Accordingly, with the increased velocity and the increased mass per unit area of washing fluid, it is possible during a washing operation to more effectively remove the solid particles that have precipitated on plates 6.

Figure 2:
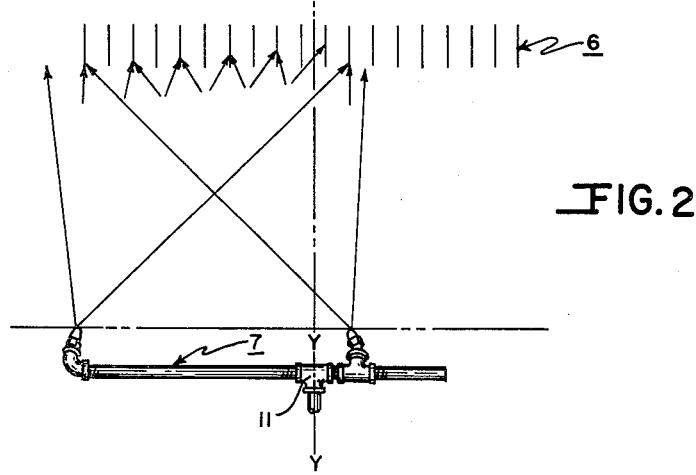
FIGURE 2 is a partially schematic plan view of a portion of the apparatus disclosed in FIGURE 1.

It is to be noted in FIGURES 1 and 2 of the drawings, that conduit 9 includes one arm which describes a radius substantially equal to the distance from the axis of rotation Y—Y of the conduit 9 to the side of housing 2; and, it also is to be noted that nozzle 22 is so positioned on the distal end of this arm of conduit 9 relative plates 6 as to direct the flat fluid sheet issuing from such nozzle to impinge against one side of each of the spaced plates 6 while the other nozzle 22 adjacent axis of rotation Y—Y directs its flat fluid sheet issuing therefrom to impinge against the other side of each of the spaced plates 6. Thus, with the washing arrangement disclosed herein, it is possible to assure that both sides of each plate are washed thoroughly during washing operations with an efficient utilization of washing fluid discharged from nozzles 22. Finally, it is to be noted in FIGURE 4 of the drawings, that nozzles 22 are mounted in relatively offset relationship on conduit 9 on opposite sides of a plane which includes the axis of rotation Y—Y and which is normal to that plane through which conduit 9 rotates. With this relatively offset arrangement disclosed, the reactive forces of the fluid sheets issuing from nozzles 22 helps to rotate conduit 9 in conjunction with the reactive force created by the jet of fluid discharged from jet discharge aperture 24.

In a typical operation of the embodiment of the invention disclosed, to wash solid particles from plates 6 after precipitating operations, it is only necessary to turn a suitable valve in conduit 18 (not shown) into "on" position. Fluid, such as water from a city water supply, is delivered through conduits 18 and 9 to the spoon-shaped nozzles 22 where it is discharged in flat concentrated sheets, a small portion being jetted out of aperture 24. The reactive forces produced by the discharge of fluid from nozzles 22 and aperture 24 cause conduit 9 to rotate about its axis of rotation Y—Y. The flat fluid sheets discharged from nozzles 22 sweep along the face of filter assembly 5 to impinge against the sides of the plates 6 of the filter assembly at angles converging toward each other, the sheet from one nozzle 22 striking against one side of each plate as it sweeps along while the sheet from the other plate strikes against the other side of each plate in its sweep. Once solid particles have been removed from plates 6 by this efficient and straight-forward operation, the valve in conduit 18 is turned to "off" position to shut-off the discharge of fluid from nozzles 22 and precipitating operations can then be resumed.

The invention claimed is:
1. In electrostatic gas filter apparatus including a housing having upstream and downstream openings with a filter assembly disposed therebetween of parallel, spaced, charged and grounded plates alternately arranged for electrostatically treating a gas stream, a washer for said filter assembly comprising longitudinally extending fluid header means mounted adjacent an opening of said housing to rotate through a complete circle about an axis intermediate the sides of said housing and in a plane substantially normal to the direction of flow of the gas stream to be treated and spoon-shaped nozzle members mounted in spaced relation on said longitudinally extending header to concentrate fluid from said header in flat sheets, said nozzle members being positioned on said header to direct the flat fluid sheets issuing therefrom toward each other to simultaneously impinge against opposite sides of the parallel, spaced plates of said filter assembly during the major portion of the rotation cycle.

2. In electrostatic gas filter apparatus including a housing having upstream and downstream openings with a filter assembly disposed therebetween of parallel, spaced, charged and grounded plates alternately arranged for electrostatically treating a gas stream, a washer for said filter assembly comprising a longitudinally extending fluid header mounted adjacent an opening of said housing to rotate about an axis of rotation positioned halfway between the sides of said housing and in a plane substantially normal to the direction of flow of the gas stream to be treated, said longitudinally extending header describing a radius substantially equal to the distance from said axis of rotation to a side of said housing, a pair of spoon-shaped nozzle members mounted in spaced relation on said header to concentrate fluid from said header in flat sheets, one of the nozzle members of said pair being mounted on said header at an extremity thereof removed from said axis of rotation and positioned to direct the flat fluid sheet issuing therefrom to impinge against one side of each of the parallel, spaced plates of said filter assembly and the other nozzle member of said pair being mounted on said header adjacent said axis of rotation of said header to direct its flat fluid sheet issuing therefrom to simultaneously impinge against the other side of each of said spaced plates during the major portion of the rotation cycle.

3. The apparatus of claim 2, said nozzles of said pair being mounted on said header on opposite sides of a first plane including said axis of rotation which first plane is normal to the plane through which said header rotates whereby the reactive forces of the fluid sheets issuing from said nozzles help to rotate said header.

References Cited in the file of this patent

UNITED STATES PATENTS

| 1,639,389 | Todd | Aug. 16, 1927 |
| 1,733,249 | Clinton | Oct. 29, 1929 |
| 2,333,551 | Pegg | Nov. 2, 1943 |
| 2,476,248 | MacKenzie | July 12, 1949 |
| 2,530,671 | Wahlin | Nov. 21, 1950 |
| 2,591,404 | Carlson | Apr. 1, 1952 |

FOREIGN PATENTS

| 299,261 | Great Britain | Oct. 25, 1928 |